United States Patent
Zhang et al.

(10) Patent No.: US 12,112,523 B2
(45) Date of Patent: Oct. 8, 2024

(54) SYSTEMS AND METHODS FOR VISION-LANGUAGE DISTRIBUTION ALIGNMENT

(71) Applicant: Salesforce, Inc., San Francisco, CA (US)

(72) Inventors: Shu Zhang, Fremont, CA (US); Junnan Li, Singapore (SG); Ran Xu, Mountain View, CA (US); Caiming Xiong, Menlo Park, CA (US); Chetan Ramaiah, San Bruno, CA (US)

(73) Assignee: Salesforce, Inc., San Francisco, CA (US)

( * ) Notice: Subject to any disclaimer, the term of this patent is extended or adjusted under 35 U.S.C. 154(b) by 265 days.

(21) Appl. No.: 17/589,725

(22) Filed: Jan. 31, 2022

(65) Prior Publication Data
US 2023/0162490 A1 May 25, 2023

Related U.S. Application Data (60) Provisional application No. 63/281,471, filed on Nov. 19, 2021.

(51) Int. Cl.
| | | |
|---|---|---|
| *G06V 10/776* | (2022.01) | |
| *G06F 16/56* | (2019.01) | |
| *G06F 16/583* | (2019.01) | |
| *G06F 40/126* | (2020.01) | |
| *G06F 40/166* | (2020.01) | |
| *G06F 40/284* | (2020.01) | |
| *G06V 10/74* | (2022.01) | |
| *G06V 10/80* | (2022.01) | |

(52) U.S. Cl.
CPC ............ *G06V 10/776* (2022.01); *G06F 16/56* (2019.01); *G06F 16/5846* (2019.01); *G06F 40/126* (2020.01); *G06F 40/166* (2020.01); *G06F 40/284* (2020.01); *G06V 10/761* (2022.01); *G06V 10/806* (2022.01)

(58) Field of Classification Search
CPC .. G06V 10/776; G06V 10/761; G06V 10/806; G06V 20/70; G06V 10/82; G06F 16/56; G06F 16/5846; G06F 40/126; G06F 40/166; G06F 40/284; G06F 40/30
USPC ......................................................... 382/159
See application file for complete search history.

(56) References Cited

U.S. PATENT DOCUMENTS

2021/0026887 A1* 1/2021 Fukushima ......... G06F 16/7837

FOREIGN PATENT DOCUMENTS

| CN | 112214570 A | * | 1/2021 | |
|---|---|---|---|---|
| CN | 113792207 A | * | 12/2021 | |
| CN | 115017911 A | * | 9/2022 | ............. G06F 40/30 |

* cited by examiner

*Primary Examiner* — Neil R McLean
(74) *Attorney, Agent, or Firm* — Haynes and Boone, LLP (57) ABSTRACT

Embodiments described herein a CROss-Modal Distribution Alignment (CROMDA) model for vision-language pretraining, which can be used for retrieval downstream tasks. In the CROMDA mode, global cross-modal representations are aligned on each unimodality. Specifically, a uni-modal global similarity between an image/text and the image/text feature queue are computed. A softmax-normalized distribution is then generated based on the computed similarity. The distribution thus takes advantage of property of the global structure of the queue. CROMDA then aligns the two distributions and learns a modal invariant global representation. In this way, CROMDA is able to obtain invariant property in each modality, where images with similar text representations should be similar and vice versa.

20 Claims, 11 Drawing Sheets

| | R@1 | R@10 |
|---|---|---|
| ALBEF | 61.1 | 86.4 |
| CROMDA | 64.5 | 88.1 |

Table 1. Zero-shot image retrieval results on Deep Fashion In-store. Bold represents the best results.

| | R@1 | R@10 |
|---|---|---|
| FashionNet | 53.0 | 73.0 |
| Hard-aware Cascade | 62.1 | 84.9 |
| Hard Triplet | 80.3 | 93.9 |
| A-BIER | 83.1 | 95.1 |
| ABE-8 | 87.3 | 96.7 |
| Fast AP | 90.0 | 97.5 |
| Divide Conquer | 90.4 | 97.5 |
| ProxyNCA++ | 90.9 | 98.2 |
| Cross Entropy | 90.6 | 98.0 |
| ALBEF | 89.8 | 97.8 |
| CROMDA | 91.7 | 98.2 |

Table 2. Image retrieval results on Deep Fashion In-store. Bold represents the best results.

| | R@1 | R@10 |
|---|---|---|
| ALBEF | 68.7 | 83.8 |
| CROMDA | 69.1 | 84.0 |

Table 3. Zero-shot image retrieval results on Stanford Online Products. Bold represents the best results.

| | R@1 | R@10 |
|---|---|---|
| Hard-aware Cascade | 70.1 | 84.9 |
| A-BIER | 74.2 | 86.9 |
| ABE-8 | 76.3 | 88.4 |
| Fast AP | 76.4 | 89.0 |
| Divide Conquer | 80.3 | 90.2 |
| ProxyNCA++ | 81.4 | 92.4 |
| Cross Entropy | 81.1 | 90.7 |
| ALBEF | 83.7 | 93.6 |
| CROMDA | 86.1 | 94.7 |

Table 4. Image retrieval results on Stanford Online Products. Bold represents the best results.

|  | text → text | | | image → image | | | image → text | | | text → image | | |
|---|---|---|---|---|---|---|---|---|---|---|---|---|
|  | R@1 | R@5 | R@10 | R@1 | R@5 | R@10 | R@1 | R@5 | R@10 | R@1 | R@5 | R@10 |
| VSE++ | 38.7 | 62.3 | 72.2 | 36.4 | 70.4 | 81.3 | 43.1 | 74.3 | 84.2 | 32.5 | 62.7 | 75.4 |
| DE(I2T+T2I) | 42.4 | 64.9 | 74.0 | 38.5 | 73.6 | 84.9 | 55.9 | 84.2 | 91.8 | 41.7 | 72.3 | 83.0 |
| ALIGN | 45.4 | 66.8 | 75.2 | 49.4 | 81.4 | 89.1 | 78.1 | 94.3 | 97.4 | 61.8 | 84.9 | 91.1 |
| ALBEF | 44.9 | 66.3 | 75.0 | 48.1 | 80.0 | 88.9 | 78.3 | 92.3 | 96.3 | 59.4 | 84.7 | 91.4 |
| CROMDA | 45.5 | 67.0 | 77.1 | 49.8 | 80.9 | 89.2 | 79.4 | 94.3 | 97.5 | 61.2 | 84.9 | 91.6 |

Table 5. Cross-modal and uni-modal retrieval performance on Crisscrossed Captions (CxC) dataset. Bold represents the best results.

FIG. 9

|  |  | Flickr30K | | | | | | | | | | | | MSCOCO | | | | | | | | | | | |
|---|---|---|---|---|---|---|---|---|---|---|---|---|---|---|---|---|---|---|---|---|---|---|---|---|---|
|  |  | image → text | | | text → image | | | | | | | | image → text | | | text → image | | | | | | | | |
|  |  | R@1 | R@5 | R@10 | R@1 | R@5 | R@10 | | | | | | R@1 | R@5 | R@10 | R@1 | R@5 | R@10 | | | | | | |
| Zero-shot | UNITER | 83.6 | 95.7 | 97.7 | 68.7 | 89.2 | 93.9 | | | | | | - | - | - | - | - | - | | | | | | |
|  | CLIP | 88.0 | 98.7 | 99.4 | 68.7 | 90.6 | 95.2 | | | | | | 58.4 | 81.5 | 88.1 | 37.8 | 62.4 | 72.2 | | | | | | |
|  | ALIGN | 88.6 | 98.7 | 99.7 | 75.7 | 93.8 | 96.8 | | | | | | 58.6 | 83.0 | 89.7 | 45.6 | 69.8 | 78.6 | | | | | | |
|  | ALBEF | 88.5 | 98.5 | 99.2 | 75.9 | 93.3 | 96.7 | | | | | | 73.3 | 91.4 | 95.7 | 53.6 | 78.7 | 86.7 | | | | | | |
|  | CROMDA | 89.5 | 98.7 | 99.7 | 77.3 | 93.6 | 96.8 | | | | | | 73.0 | 91.4 | 95.8 | 55.0 | 80.2 | 87.7 | | | | | | |
| Fine-tuned | UNITER | 87.3 | 98.0 | 99.2 | 75.6 | 94.1 | 96.8 | | | | | | 65.7 | 88.6 | 93.8 | 52.9 | 79.9 | 88.0 | | | | | | |
|  | UNIMO | 89.4 | 98.9 | 99.8 | 78.0 | 94.2 | 97.1 | | | | | | - | - | - | - | - | - | | | | | | |
|  | OSCAR | - | - | - | - | - | - | | | | | | 73.5 | 92.2 | 96.0 | 57.5 | 82.8 | 89.8 | | | | | | |
|  | VILLA | 87.9 | 97.5 | 98.8 | 76.3 | 94.2 | 98.6 | | | | | | - | - | - | - | - | - | | | | | | |
|  | ALIGN | 95.3 | 99.8 | 100.0 | 84.9 | 97.4 | 98.6 | | | | | | 77.0 | 93.5 | 96.9 | 59.9 | 83.3 | 89.8 | | | | | | |
|  | ALBEF | 95.9 | 99.8 | 100.0 | 85.6 | 97.5 | 98.9 | | | | | | 77.6 | 94.3 | 97.2 | 60.7 | 84.3 | 90.5 | | | | | | |
|  | CROMDA | 96.9 | 99.8 | 99.9 | 85.6 | 97.4 | 98.8 | | | | | | 78.7 | 93.9 | 97.2 | 60.9 | 84.2 | 90.7 | | | | | | |

Table 6. Cross-modal retrieval performance on Flickr30K and MSCOCO datasets. Bold represents the best results.

FIG. 10

|  | Flickr30K | | | | | | MSCOCO | | | | | |
|---|---|---|---|---|---|---|---|---|---|---|---|---|
|  | image → text | | | text → image | | | image → text | | | text → image | | |
|  | R@1 | R@5 | R@10 | R@1 | R@5 | R@10 | R@1 | R@5 | R@10 | R@1 | R@5 | R@10 |
| ALBEF | 95.9 | 99.8 | 100.0 | 85.6 | 97.5 | 98.9 | 77.6 | 94.3 | 97.2 | 60.7 | 84.3 | 90.5 |
| +CDC | 96.8 | 99.8 | 99.9 | 85.6 | 97.3 | 98.9 | 78.2 | 93.7 | 97.0 | 60.8 | 84.1 | 90.7 |
| +CDC +DITM | 96.9 | 99.8 | 99.9 | 85.6 | 97.4 | 98.8 | 78.7 | 93.9 | 97.2 | 60.9 | 84.2 | 90.7 |

Table 7. Ablation study on CDC and DITM (dynamic hard mining ITM) on Flickr30K and MSCOCO datasets.

FIG. 11

|  | Flickr30K | | | | | | MSCOCO | | | | | |
|---|---|---|---|---|---|---|---|---|---|---|---|---|
|  | image → text | | | text → image | | | image → text | | | text → image | | |
|  | R@1 | R@5 | R@10 | R@1 | R@5 | R@10 | R@1 | R@5 | R@10 | R@1 | R@5 | R@10 |
| ALBEF | 95.9 | 99.8 | 100.0 | 85.6 | 97.5 | 98.9 | 77.6 | 94.3 | 97.2 | 60.7 | 84.3 | 90.5 |
| $\tau=0.07$ | 95.8 | 99.7 | 99.9 | 85.2 | 97.3 | 98.7 | 77.6 | 93.9 | 97.2 | 60.6 | 84.1 | 90.7 |
| $\tau=0.2$ | 96.0 | 99.8 | 99.9 | 85.5 | 97.3 | 98.7 | 77.6 | 93.9 | 97.2 | 60.6 | 84.1 | 90.7 |
| $\tau=1$ | 96.9 | 99.8 | 99.9 | 85.6 | 97.4 | 98.8 | 78.7 | 93.9 | 97.2 | 60.9 | 84.2 | 90.7 |

Table 8. Ablation study on $\tau_2$

FIG. 12

SYSTEMS AND METHODS FOR VISION-LANGUAGE DISTRIBUTION ALIGNMENT

CROSS REFERENCE(S)

The instant application is a nonprovisional of and claims priority under 35 U.S.C. 119 to U.S. provisional application No. 63/281,471, filed on Nov. 19, 2021, which is hereby expressly incorporated by reference herein in its entirety.

TECHNICAL FIELD

The present disclosure relates generally to machine learning models and vision-language models, and more specifically, to vision-language distribution alignment for uni-modal and cross-modal retrieval.

BACKGROUND

Vision-language pre-training (VLP) involves training a machine learning model to align vision content of an image or video with a natural language text. For example, an image taken from an online shopping site may be paired with the caption describing what product is shown in the image. Most existing VLP methods pre-train image and text representations on very large-scale datasets. However, existing VLP models often fail to exploit (1) the global structure of the dataset, e.g., similarity among all inter-samples (similar images or similar text descriptions), and (2) the relationships between cross-modal representations and uni-modal representations. For example, some VLP models may align features for each image-text pair, but do not use the global structural information in the training data. As a result, the uni-modal representation is less effective, where similar images are not enforced to have similar representations. And similarly, similar texts fail to share similar representations either.

Therefore, there is a need for a more efficient VLP model.

BRIEF DESCRIPTION OF THE DRAWINGS

FIGS. 6-12 provide example data charts illustrating aspects of example data performance of the CROMDA model described herein, according to one or more embodiments described herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Existing vision-language pre-training (VLP) methods often adopt vision and language encoders to separately learn uni-model representations, e.g., text representations or vision representations, and employ the image-text contrastive learning which models cross-modal interaction with dot product and maximizes the feature similarity between positive image-text pairs. However, these approaches often fail to capture the global structure of the dataset, e.g., similarity among all inter-samples (similar images or similar text descriptions), or the relationships between cross-modal representations and uni-modal representations. As a result, the uni-modal representation is less effective, where similar images are not enforced to have similar representations. And similarly, similar texts fail to share similar representations either.

In view of the under-utilization of inner structure of the datasets, embodiments described herein a CROss-Modal Distribution Alignment (CROMDA) model for vision-language pretraining, which can be used for retrieval downstream tasks. In the CROMDA mode, global cross-modal representations are aligned on each unimodality. Specifically, a uni-modal global similarity between an image/text and the image/text feature queue are computed. A softmax-normalized distribution is then generated based on the computed similarity. The distribution thus takes advantage of property of the global structure of the queue. CROMDA then aligns the two distributions and learns a modal invariant global representation. In this way, CROMDA is able to obtain invariant property in each modality, where images with similar text representations should be similar and vice versa.

Figure 1:
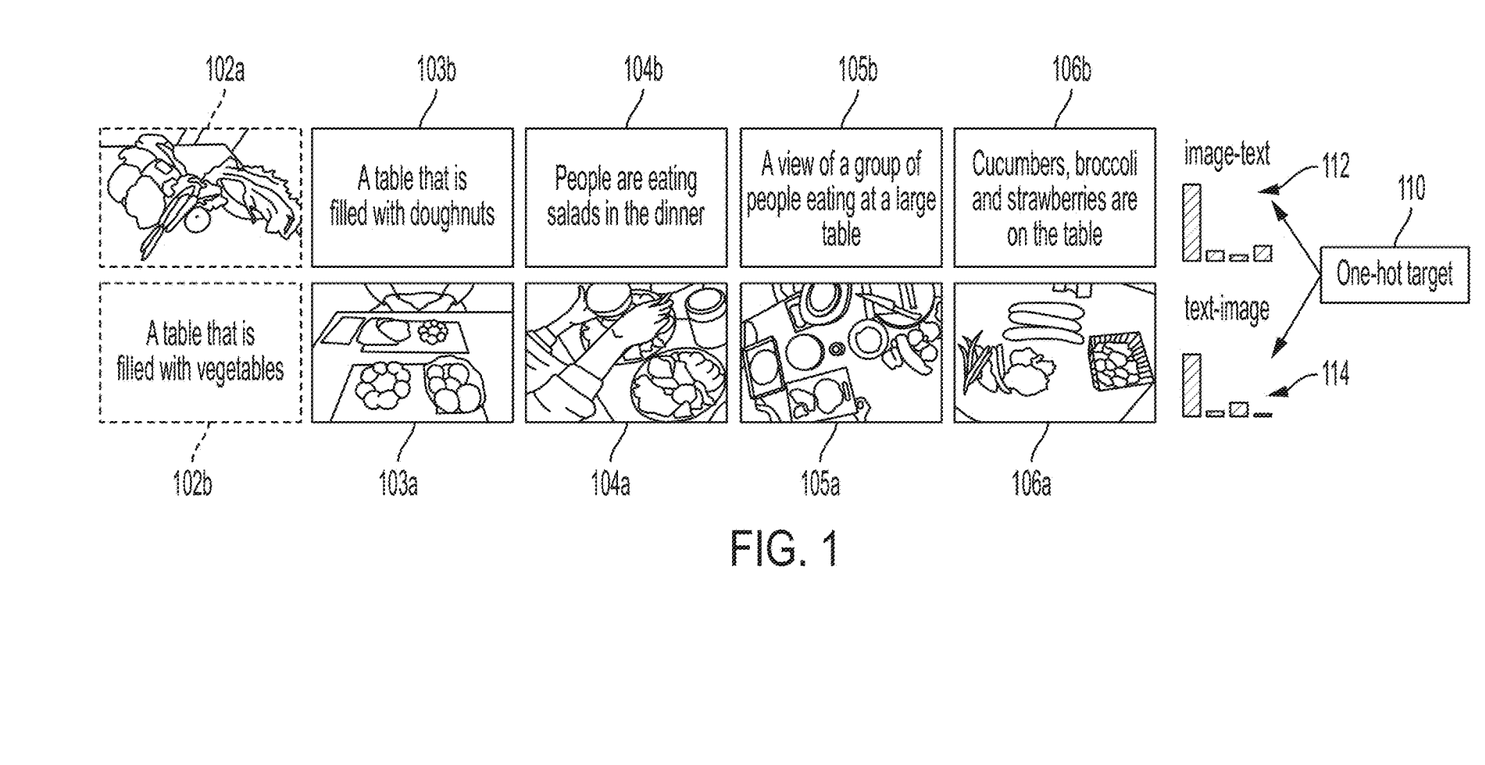
FIG. 1 is a simplified diagram illustrating aspects of the traditional cross-modal contrastive learning (CMC) model for matching an image with a text description, according to one or more embodiments described herein.

FIG. 1 is a simplified diagram illustrating aspects of the traditional cross-modal contrastive learning (CMC) model for matching an image with a text description, according to one or more embodiments described herein. Features of images 102a, 103a, 104a, 105a, 106a and texts 102b, 103b, 104b, 105b, 106b may be input through a large feature queue. The CMC uses one-hot target 110 to enforce a paired image-text such as 102a and 102b to have the highest similarity, in contrast to the negatives image-text pairs such as 103a and 103b. Specifically, the CMC model computes a similarity 112 between an image and texts, or a similarity 114 between a text and images in the large feature queue. The image-text similarities 112 and the text-image similarities 114 are then used to produce a CMC loss.

The image-text similarities 112 and the text-image similarities 114 may be used to produce a softmax-normalized prediction that is compared with the one-hot target 110, where the largest probability corresponds to the selected positive sample. Although CMC loss is calculated globally (within a queue), its close one-hot prediction loses the information within the global dataset structure as information of other samples that are not adopted in CMC.

Figure 2:
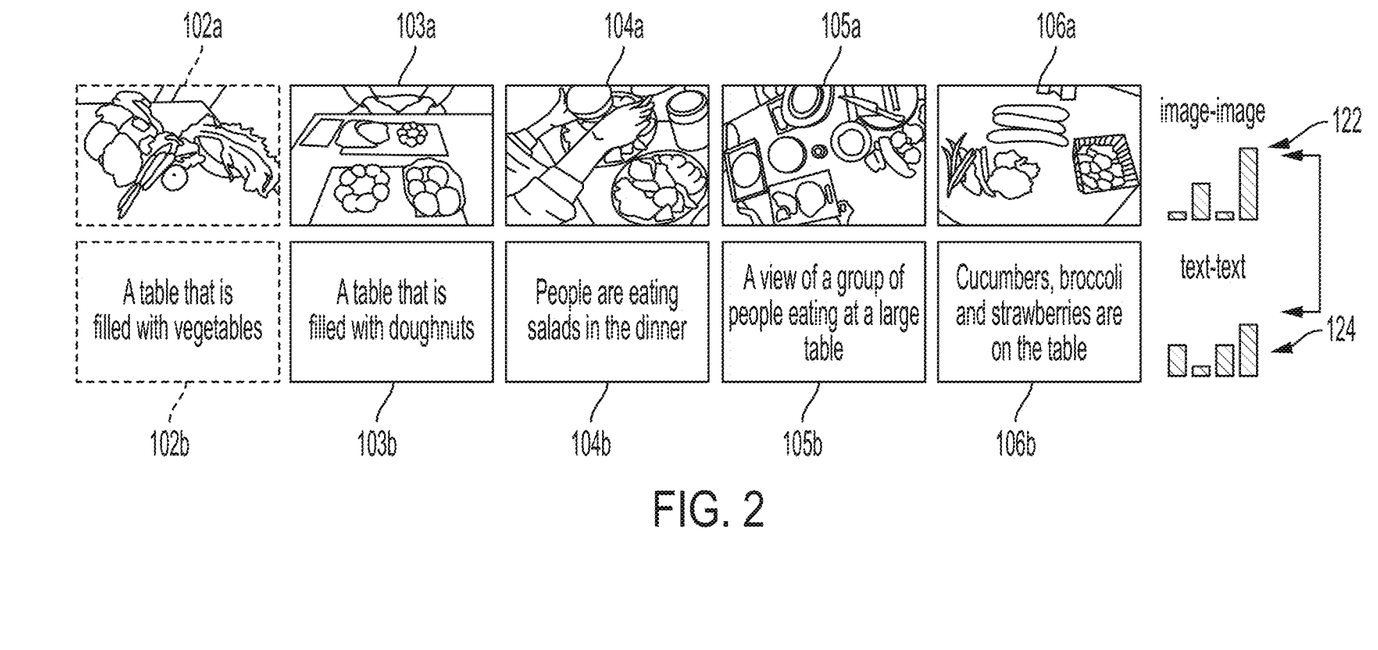
FIG. 2 is a simplified diagram illustrating aspects of CROMDA model for matching an image with a text description in contrast with the CMC model shown in FIG. 1, according to one or more embodiments described herein.

FIG. 2 is a simplified diagram illustrating aspects of CROMDA model for matching an image with a text description in contrast with the CMC model shown in FIG. 1, according to one or more embodiments described herein. Given the image features of images 102a, 103a, 104a, 105a, 106a and text features of texts 102b, 103b, 104b, 105b, 106b, the CROMDA model calculates an image-image uni-modal global similarity 122 between image features and a text-text uni-modal global similarity 124 between text features. The similarities 122 and 124 generates a softmax-normalized distribution. The distribution takes advantage of property of the global structure of the queue.

The CROMDA model then aligns the two distributions from the image-image similarity 122 and text-text similarity 124, and computes a loss objective that encourages the image-image similarity 122 to match the text-text similarity 124 (and vice versa), thus exploiting more supervision from one modality to regularize training of the other. In this way, the CROMDA model is able to achieve consistent representations in each modality, i.e., images corresponding to similar text representations should be similar and texts corresponding to similar images should also be similar.

Figure 3:
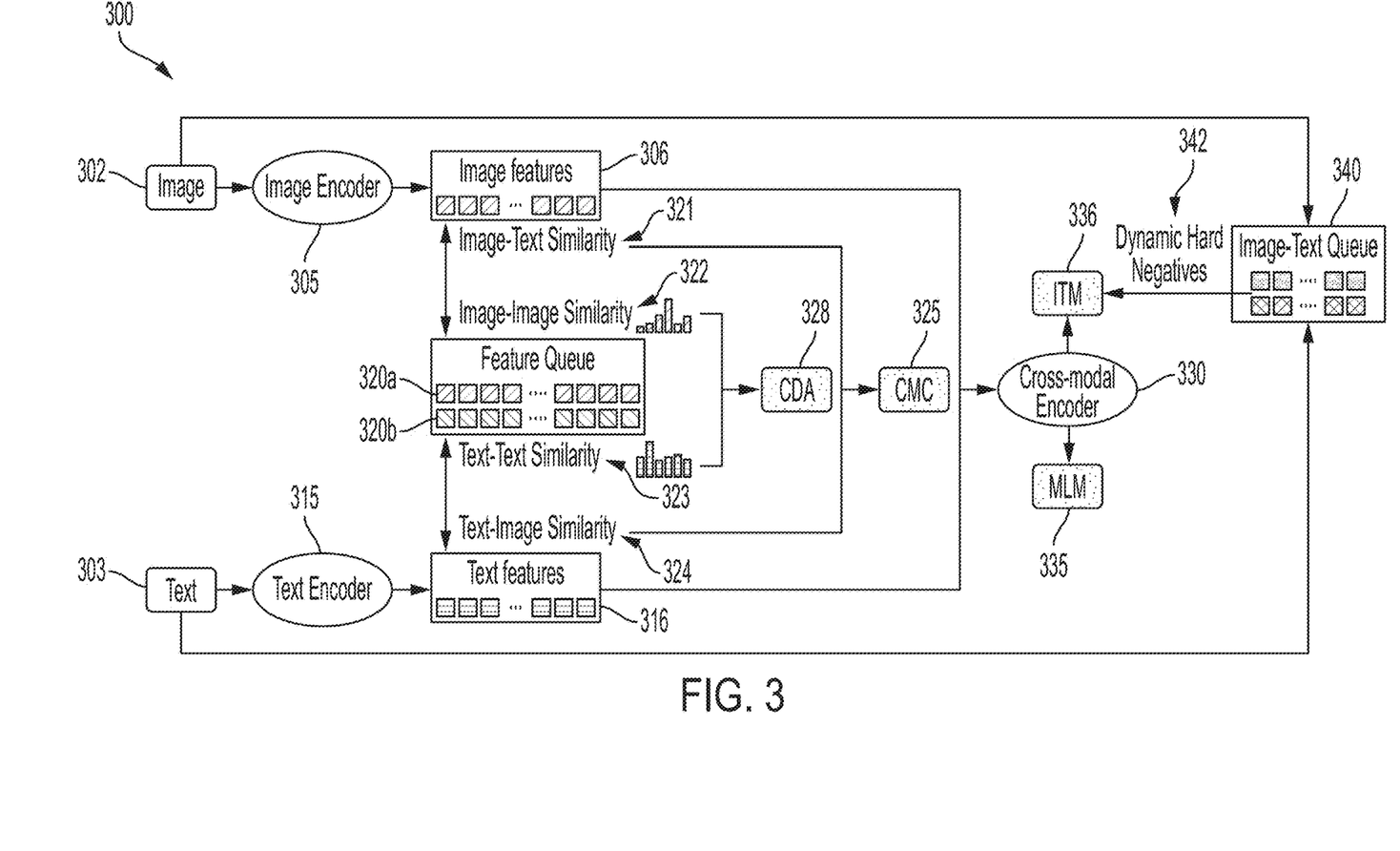
FIG. 3 is a simplified block diagram illustrating example CROMDA architecture, according to embodiments described herein.

FIG. 3 is a simplified block diagram illustrating example CROMDA architecture 300, according to embodiments described herein. The CROMDA architecture 300 comprises an image encoder 305 that receives an input image 302 and a text encoder 315 that receives an input text 303. The image encoder 305 and the text encoder 315 are applied to image 302 and text 303 individually.

Specifically, the image encoder 305 may be used to encode the image 302 into visual features 306, and the text encoder 315 may encode the text 303 into language features 316. For example, the image encoders 305 may be composed of a 12-layer vision transformer, and its output embedding (image features 306) is denoted as $f_i$. The text encoder 315 may be a 6-layer transformer, and its output embedding (text features 316) is denoted as $f_T$.

The feature queues 320*a-b* store a large number of features 306 and 316. Specifically, the two feature queues 320*a-b* are used to each store the most recent Q image or text representations, which can be used to compute the momentum feature representations $F^I$, $F^T$, respectively. For example, the momentum feature representations in a feature queue 320*a* or 320*b* may be computed as a continuously evolving exponential-moving average of image or text feature representations in the feature queue 320*a* or 320*b*, respectively, e.g., $F_q^I$, $1 \leq q \leq Q$, represents the momentum image feature representation when there are q image feature representations in the feature queue. The momentum feature representation is timely updated as a new feature representation is encoded and added into the feature queue 320*a* or 320*b*.

The cross-modal similarity s between an image representation to all text representations, or a text representation to all image representations in the feature queues is computed. For example, the image-to-text similarity 321 is computed as the similarity between an image feature representation $f_i$ and all text features in the text feature queue:

$$s^{i2t} = \frac{\exp(s(f^I, F^T)/\tau_1)}{\Sigma_{q=1}^{Q}\exp(s(f^I, F_q^T)/\tau_1)} \quad (1)$$

where $\tau_1$ is a learned temperature parameter, and F denotes the momentum representations in the queue.

Similarly, the text-to-image similarity 324 is computed as the similarity between a text feature representation $f_T$ and all image features in the image feature queue:

$$s^{t2i} = \frac{\exp(s(f^T, F^I)/\tau_1)}{\Sigma_{q=1}^{Q}\exp(s(f^T, F_q^I)/\tau_1)} \quad (2)$$

Given the one-hot ground truth $y^{i2t}$ and $y^{t2i}$ from the training sample, the cross-modal contrastive (CMC) loss 325 is computed as:

$$L_{CMC} = \mathbb{E}_{(I,T)}(H(y^{i2t}, S^{i2t}) + H(y^{t2i}, s^{t2i})) \quad (3)$$

where H( ) denotes the cross-entropy of two distributions.

In one embodiment, the CROMDA architecture 300 may compute a cross-modal distribution alignment (CDA) loss 328 to align queue-wise cross-modal distributions. Specifically, representation distributions across modalities (e.g., image vs. text) should be aligned with each other in the cross-modal learning, which is expected to show effectiveness on both cross-modal and uni-modal downstream tasks. Thus, the CDA loss 328 is designed to minimize the distribution of image representations $f_I$ and that of text representations $f_T$ within a queue.

Specifically, the feature queues 320*a-b* are also used to compute queue-wise unit-modal similarities. Specifically, the uni-modal similarity is computed between an image representation to all image representations in the image feature queue, or between a text representation to all text representations in the text feature queue. For example, the image-to-image similarity 322 is computed as:

$$s^{i2i} = \frac{\exp(s(f^I, F^I)/\tau_2)}{\Sigma_{q=1}^{Q}\exp(s(f^I, F_q^I)/\tau_2)} \quad (4)$$

where $\tau_2$ is a pre-defined temperature parameter. This parameter is expected to be larger than $\tau_1$.

Similarly, the text-to-text similarity 323 is computed as:

$$s^{t2t} = \frac{\exp(s(f^T, F^T)/\tau_2)}{\Sigma_{q=1}^{Q}\exp(s(f^T, F_q^T)/\tau_2)} \quad (5)$$

In order to align the representation distributions across modalities, the CDA loss 328 is then computed as:

$$L_{CDA} = \mathbb{E}_{(I,T)}(KL(s^{i2i}, s^{i2t}) + KL(s^{t2t}, s^{t2i})) \quad (6)$$

where KL represents the Kullback-Leibler divergence. $L_{CDA}$ thus enforces the similar samples to share similar representations.

In one embodiment, the CROMDA architecture 300 further includes a cross-modal encoder 330 that is applied on top of the output representations 306, 316 of image and text encoders, respectively, e.g., the cross attention of $f_I$ and $f_T$.

In one embodiment, the ross-modal encoder 330 may be trained with a masked language modeling (MLM) loss. For example, text token input to the text encoder 315 may be randomly masked out with 15% probability, and be replaced with a special token. The masked words are then predicted and compared with the unmasked words and the image information to compute the MLM loss 335. Additional details of computing the MLM loss 335 may be found in co-pending and commonly assigned U.S. patent application Ser. No. 17/370,524, filed Jul. 8, 2021, which is hereby expressly incorporated by reference herein in its entirety.

The cross-modal encoder 330 may be further trained with an image-text matching (ITM) loss 336, e.g., via predicting whether an image-text pair (I, T) is matched or not. For example, for each image input, a positive sample (e.g., a text that matches with the image) and a negative sample (e.g., a text that does not match with the image) are selected from a mini-batch. Given a one-hot ground truth $y^{itm}$, the ITM loss may be computed as:

$$L_{ITM} = \mathbb{E}_{I,T}H(y^{itm}, s^{itm}(f^I, f^T)) \quad (7)$$

where $s^{itm}$ is the normalized similarity between the image feature vector and the text feature vector, e.g., the normalized dot product between the two vectors.

Thus, calculating the ITM loss 336 involves at least a positive image-text pair and a negative image-text pair. A dynamic hard negatives mining image-text matching algorithm may be adopted to efficiently find a negative sample that is not limited to be within the mini-batch. The dynamic mining approach adopts an image-text queue 340, which is configured to store and provide more samples than a mini-batch, to improve negative samples selection.

For example, the image-text queue 340 may be built to include the input image samples 302 and text samples 303, which serves as a dictionary of image-text pairs. The queues 340 can separate the dictionary size from the mini-batch size, and therefore can make the number of negative samples larger than the mini-batch size. The queues 340 can be dynamic updated with new samples coming in.

The image-text queue 340 is configured to maintain original images and texts, which may take a form of two queues of images and text, respectively. The image encoder 305 and the text encoder 315 may each employ a timely updated momentum encoder that encodes the images 302 and/or texts 303 into momentum feature representations 306 and 316 stored at the feature queues 320a-b. The momentum feature representations stored in the feature queues 320a-b may be used to compute similarities 321, 322, 323 and 324 to update momentum features in a new mini-batch.

For each image in a mini-batch, one negative text feature representation is sampled from the feature queue 320a-b corresponding to a much larger batch of training data following the contrastive similarity distribution, e.g., the image-text similarity 321. Then the original text corresponding to the sampled text representation is selected from the image-text queue 340, and the text embedding $f_T$ is re-calculated for this negative text sample. Likewise, a negative image can be sampled from the feature queue 320a-b for an input text, and the image embedding can be re-calculated after locating the original image from the image-text queue 340.

In this way, dynamic hard negative features 342 can be produced for computing the ITM loss 336.

Therefore, in one training epoch, the CROMDA model may be updated separately, concurrently, and/or sequentially by the objectives $L_{MLM}$, $L_{CMC}$, $L_{ITM}$, or $L_{CDA}$. Or, the CROMDA model may be updated by a weighted sum of the four objectives:

$$L = L_{MLM} + L_{CMC} + L_{ITM} + \alpha L_{CDA} \quad (8)$$

where $\alpha$ is a weight parameter, e.g., $\alpha$=0.2, 0.3, and/or the like.

Figure 4:
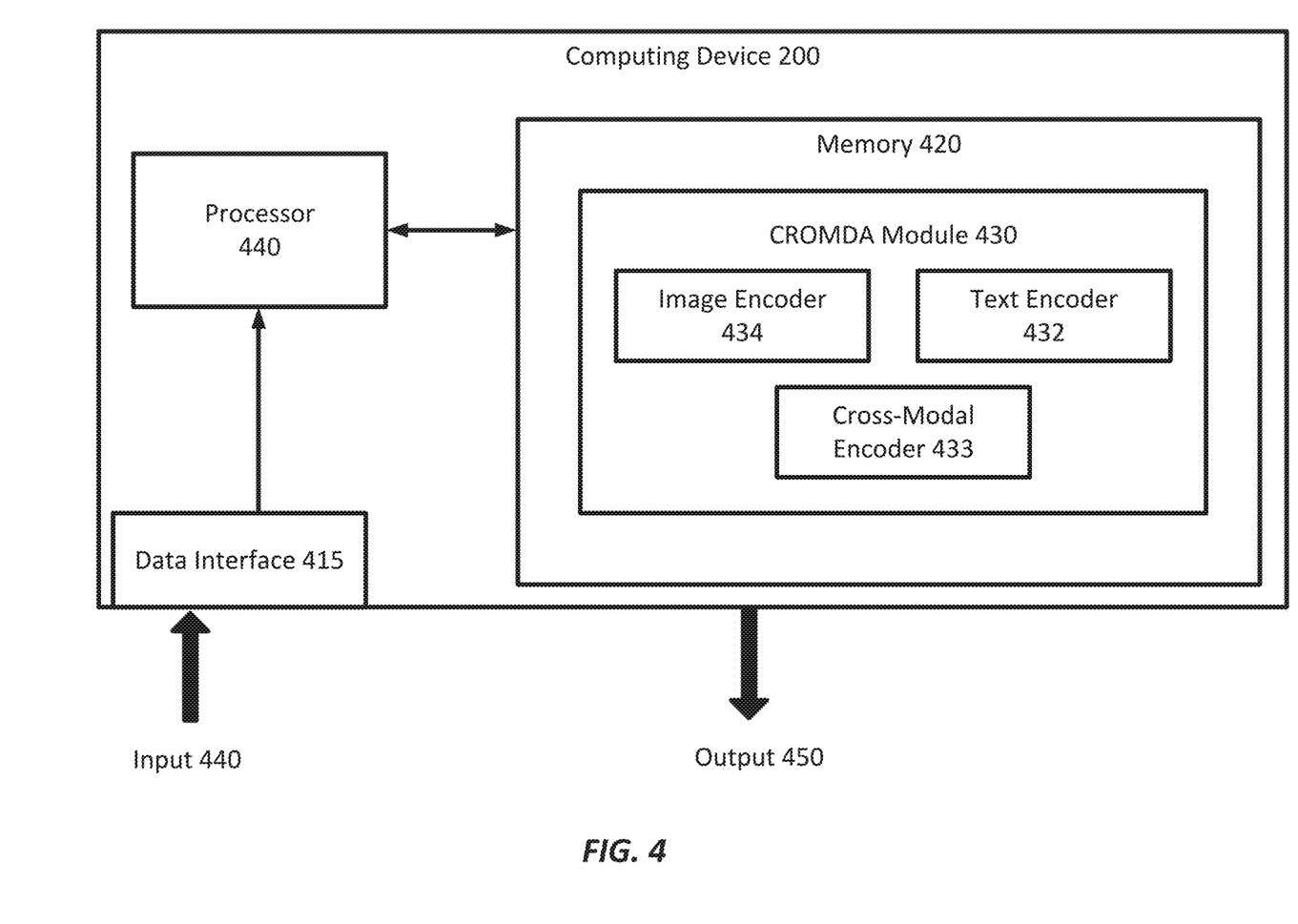
FIG. 4 is a simplified diagram of a computing device for implementing the CROMDA model, according to some embodiments.

FIG. 4 is a simplified diagram of a computing device for implementing the CROMDA model, according to some embodiments. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for an online adaptation module 430 that may be used to implement and/or emulate the systems and models, and/or to implement any of the methods described further herein. In some examples, the CROMDA module 430, may receive an input 440, e.g., such as an input image or a text via a data interface 415. The CROMDA module 430 may generate an output 450 such as an aligned image and text pair in response to the input 440.

The CROMDA module 430 may further include an image encoder 431 (e.g., similar to 305 in FIG. 3), a text encoder 432 (e.g., similar to 315 in FIG. 3), and a cross-model encoder 433 (e.g., similar to 330 in FIG. 3). In some examples, the CROMDA module 430 and sub-modules 431-133 may be implemented using hardware, software, and/or a combination of hardware and software.

Figure 5:
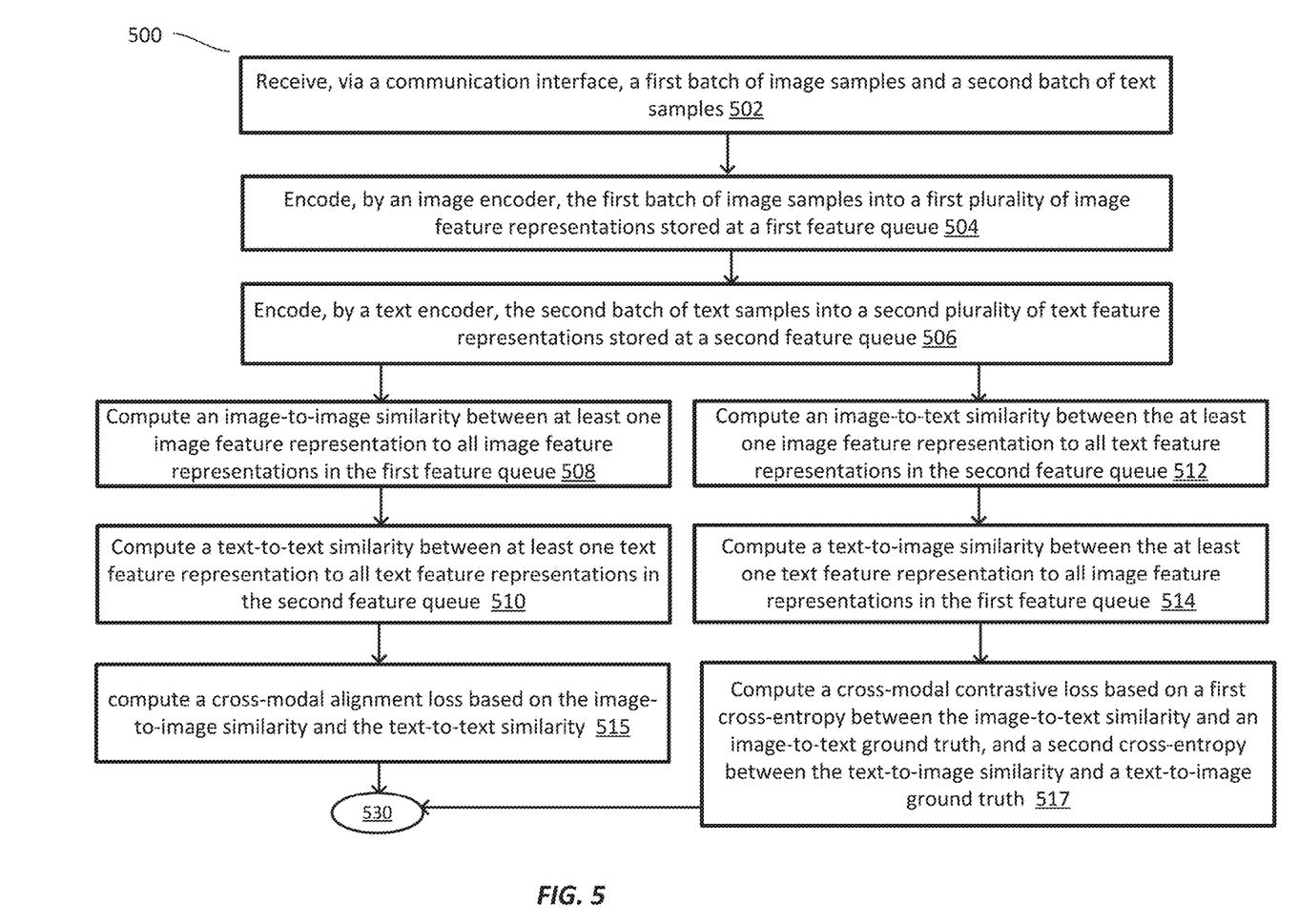
FIG. 5 is a simplified logic flow diagram illustrating a method of training a vision-language distribution alignment network, according to some embodiments described herein.

Some examples of computing devices, such as computing device 400 may include non-transitory, tangible, machine readable media that include executable code that when run by one or more processors (e.g., processor 410) may cause the one or more processors to perform the processes of method 500 described below. Some common forms of machine readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

CROMDA Work Flow

FIG. 5 is a simplified logic flow diagram illustrating a method of training a vision-language distribution alignment network, according to some embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of the CROMDA module 430 (FIG. 4) to perform video-and-language alignment pretraining.

At step 502, a first batch of image samples and a second batch of text samples are received via a data interface (e.g., 415 in FIG. 4).

At step 504, an image encoder (e.g., 305 in FIG. 3) encodes the first batch of image samples into a first plurality of image feature representations stored at a first feature queue (e.g., 320a in FIG. 3).

At step 506, a text encoder (e.g., 315 in FIG. 3) encodes the second batch of text samples into a second plurality of text feature representations stored at a second feature queue (e.g., 320b in FIG. 3).

At step 508, an image-to-image similarity is computed between at least one image feature representation to all image feature representations in the first feature queue. For example, a plurality of momentum image feature representations as the plurality of image feature representations are continuously added to the first feature queue. At least one momentum image feature representation is computed as an exponential moving average of image feature representations that are currently in the first feature queue. The image-to-image similarity is then computed based on vector similarities between the at least one image feature representation and each of the plurality of momentum image feature representations, e.g., according to Eq. (4).

At step 510, a text-to-text similarity is computed between at least one text feature representation to all text feature representations in the second feature queue. For example, a plurality of momentum text feature representations as the plurality of text feature representations are continuously added to the second feature queue. At least one momentum text feature representation is computed as an exponential moving average of text feature representations that are currently in the second feature queue. The text-to-text similarity is computed based on vector similarities between the at least one text feature representation and each of the plurality of momentum text feature representations, e.g., according to Eq. (5).

At step 515, a cross-modal alignment (CDA) loss based on the image-to-image similarity and the text-to-text similarity. For example, the CDA loss is computed based on a first Kullback-Leibler divergence between the image-to-image similarity and the text-to-text similarity, and a second Kullback-Leibler divergence between the text-to-text similarity and the image-to-image similarity, e.g., according to Eq. (6).

Back to step 506, method 500 further optionally proceeds to step 512, at which an image-to-text similarity between the at least one image feature representation to all text feature representations in the second feature queue, e.g., according to Eq. (1).

At step 514, a text-to-image similarity is computed between the at least one text feature representation to all image feature representations in the first feature queue, e.g., according to Eq. (2).

At step 516, a cross-modal contrastive (CMC) loss is computed based on a first cross-entropy between the image-to-text similarity and an image-to-text ground truth, and a second cross-entropy between the text-to-image similarity and a text-to-image ground truth, e.g., according to Eq. (3).

Method 500 then proceeds from steps 515 and 517 to step 550.

In one embodiment, back to step 506, method 500 further optionally proceeds to step 520, at which a cross-modal encoder (e.g., 330 in FIG. 3) applies cross-attention over the first plurality of image feature representations and second plurality of text feature representations. Method 500 then proceeds from step 520 to steps 522 and 521 concurrently, alternately, sequentially, or in any other order.

At step 522, randomly replaced text tokens in the second plurality of text samples are predicted based on the cross-attention.

At step 524, a masked language modeling (MLM) loss is computed based on the predicted text tokens and original text tokens.

On the other hand, at step 521, an image-text pair is selected, e.g. from selecting a subset of samples from the first batch of image samples and the second batch of text samples. At step 523, an image-text matching (ITM) loss is computed based on a similarity between an image sample and a text sample in an image-text pair, and a one-hot ground truth corresponding to the image-text pair, e.g., according to Eq. (7). For example, the image-text pair can be positive (matching image and text) or negative (non-matching image and text). To generate a negative pair, an image-text queue is built storing a plurality of image-text pairs from the first batch of image samples and the second batch of text samples, which is dynamically updated when new input samples are received. A negative sample corresponding to a sample in the subset from the image-text queue to form a negative image-text pair.

At step 530, a weighted sum of the cross-modal distribution alignment loss, the cross-modal contrastive loss, a masked language modeling loss and an image-text matching loss, e.g., according to Eq. (8).

At step 532, at least the image encoder and the text encoder, and optionally the cross-modal encoder may be jointly updated based on the weighted sum, e.g., via backpropagation.

Example Performance

Three web datasets Conceptual Captions (described in Sharma et al., Conceptual captions: A cleaned, hypernymed, image alt-text dataset for automatic image captioning, in proceedings of annual meeting of association of computational linguistics (ACL), 2018), SBU Captions (Ordonez et al., Im2text: Describing images using 1 million captioned pho-tographs. in proceedings of NeurIPS, 2011), Conceptual 12M (Changpinyo et al., Conceptual 12m: Pushing web-scale image-text pre-training to recognize long-tail visual concepts, in proceedings of Computer Vision and Pattern Recognition (CVPR), 2021) and two in-domain datasets MSCOCO (Lin et al., Microsoft coco: common objects in context, in proceedings of European Conference on Computer Vision (ECCV), 2014), Visual Genome (Krishna et al., Visual genome: Connecting language and vision using crowdsourced dense image annotations, International Journal of Computer Vision, 123:32-73, 2017) are used for pe-training the CROMDA model. The total number of image-text pairs is 14M.

For cross-modal retrieval task, the Flickr30K (Plummer et al., Flickr30k entities: collecting region-to-phrase correspondences for richer image-to-sentence models, in proceedings of International Conference on Computer Vision (ICCV), 2015) and MSCOCO data sets are used. In Flickr30K, the numbers of image-text pairs are 29K/1K/1K for train/validation/test, while they are 112K/5K/5K in MSCOCO. In addition, Crisscrossed Captions (CxC) (Parekh et al., Crisscrossed captions: Extended intramodal and intermodal semantic similarity judgments for MSCOCO, in arXiv preprint arXiv:2004.15020, 2020), a modified version of MSCOCO, is adopted as the text input data. CxC adopts additional human semantic similarity judgments for both cross-modal and uni-modal pairs, and thus naturally fits the scope of CROMDA.

For uni-modal retrieval task, CxC is adopted as well since it contains uni-modal retrieval ground truth. In addition, two most image retrieval datasets, Deep Fashion In-shop (Liu et al., Deepfashion: Powering robust clothes recognition and retrieval with rich annotations, in proceedings of CVPR, pages 1096-1104, 2016) and Stanford Online Products (Song et al., Deep metric learning via lifted structured feature embedding, in proceedings of CVPR, 2016) are adopted for the image retrieval task. In Deep Fashion In-shop, there are 25,882 images of 3,997 classes for training and 28,760 images of 3,985 classes for testing. In the test dataset, a query set with 14,218 images and a gallery set with 12,612 images are partitioned. In Stanford On-line Products, there are 59,551 images of 11,318 classes for training and 60,502 images of 11,316 classes for testing.

To build the CROMDA model, a BERTbase with 123.7M parameters and ViT with 85.8M parameters are adopted. The BERTbase has 12 layers, and we use the first 6 layers for the text encoder initialization and the last 6 layers for the cross-modal encoder initialization. CROMDA is pre-trained for 30 epochs using a batch size of 256 on 8 Nvidia A100 GPUs. The optimizer is AdamW (Loshchilov et al., Decoupled weight decay regularization, in proceedings of International Conference on Learning Representation, 2019) with weight decay ratio as 1e−5, and the initial learning rate is set to 1e−4. In the pre-training, the image is cropped to 256×256. In the fine-tuning, the resolution of 384×384 is used. The size of the feature queue is set to 65,356, and the size of the image-text queue is set to 1,024. The hyper-parameter $\alpha$ is set to 0.2, and $\tau_2$ is set to 1.

To test the effectiveness of the CROMDA model, experiments are conducted on unimodal retrieval task. Most of the tasks are on image retrieval, while the text retrieval task is performed in CxC as well. Example baseline models for comparison with the CROMDA model include: ALBEF (described in co-pending and commonly assigned U.S. application Ser. No. 17/370,524), FashionNet (Liu et al.), Hard-aware cascade (Yuan et al., Hard-aware deeply cascaded embedding, in proceedings of ICCV, 2017), hard triplet (Zhao et al., An adversarial approach to hard triplet, in proceedings of ECCV, 2018), A-BIER (Kim et al., Attention-based ensemble for deep metric learning, in proceedings of ECCV, 2018), Fast AP (Cakir et al., Deep metric learning to rank, in proceedings of CVPR, 2019), Divide Conquer (Sanakoyeu et al., Improving deep metric learning by divide and conquer, in proceedings of IEEE TPAMI, 2021), ProxyNCA++(Teh et al., Proxynca++: Revisiting and revitalizing proxy neighbor-hood component analysis, in proceedings of ECCV, 2020), Cross Entropy (Boudiaf et al., A unifying mutual information view of metric learning: cross-entropy vs. pairwise losses, in proceedings of ECCV, 2020).

Figure 6:
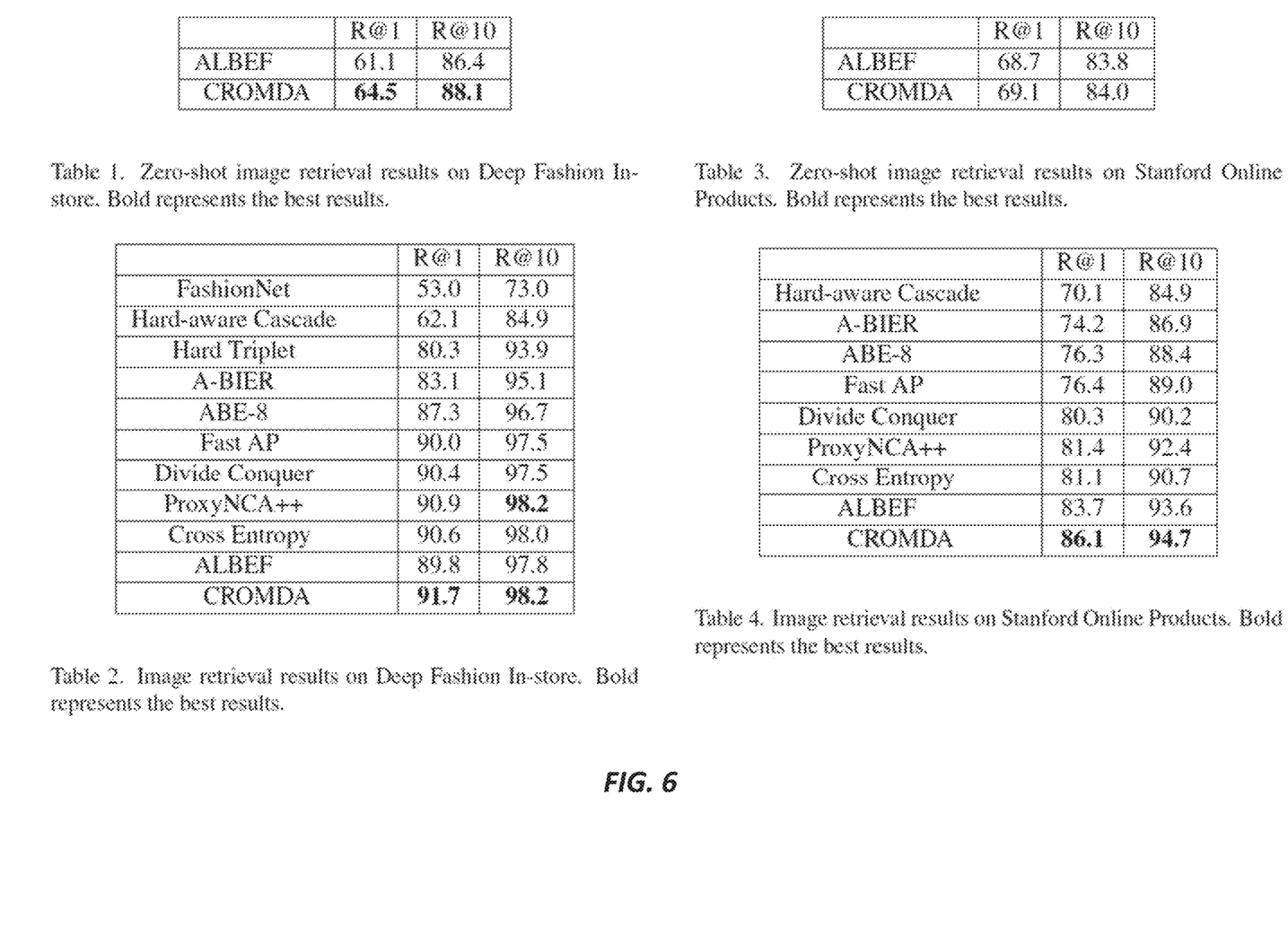

On the Deep Fashion In-Store Dataset, experiments are conducted on the commonly adopted image retrieval dataset (Liu et al.). Table 1 in FIG. 6 compares zero-shot performance between ALBEF and CROMDA. It is seen that CROMDA achieves 3.4% improvement on R@1 over ALBEF by pre-training on the same dataset. It proves that using queue-wise global training data to align feature distributions can improve uni-modal representation learning. Since few cross-modal pre-training methods focus their experiments on the image retrieval task, Table 2 of FIG. 6 compares some image retrieval methods with CROMDA. These methods normally develop metric learning methods that are specially designed for the im-age retrieval task. ALBEF, which is pre-trained on noisy image-text pairs, has achieved comparable results to the state-of-the-art methods. In addition, CROMDA improves ALBEF by 1.9%, and obtains state-of-the-art image retrieval results on Deep Fashion In-store dataset.

On the Stanford Online Products Dataset, results are shown on another commonly adopted image retrieval datasets, Stanford Online Products (SOP). Table 3 of FIG. 6 shows that CROMDA out-performs ALBEF in zero-shot stage. In Table 4 of FIG. 6, it is shown that zero-shot ALBEF and CROMDA have achieved comparable results to some fine-tuned models. With fine-tuning, CROMDA is able to set a new record, leading the image metric learning based method by a large margin of 5%.

Figure 7:
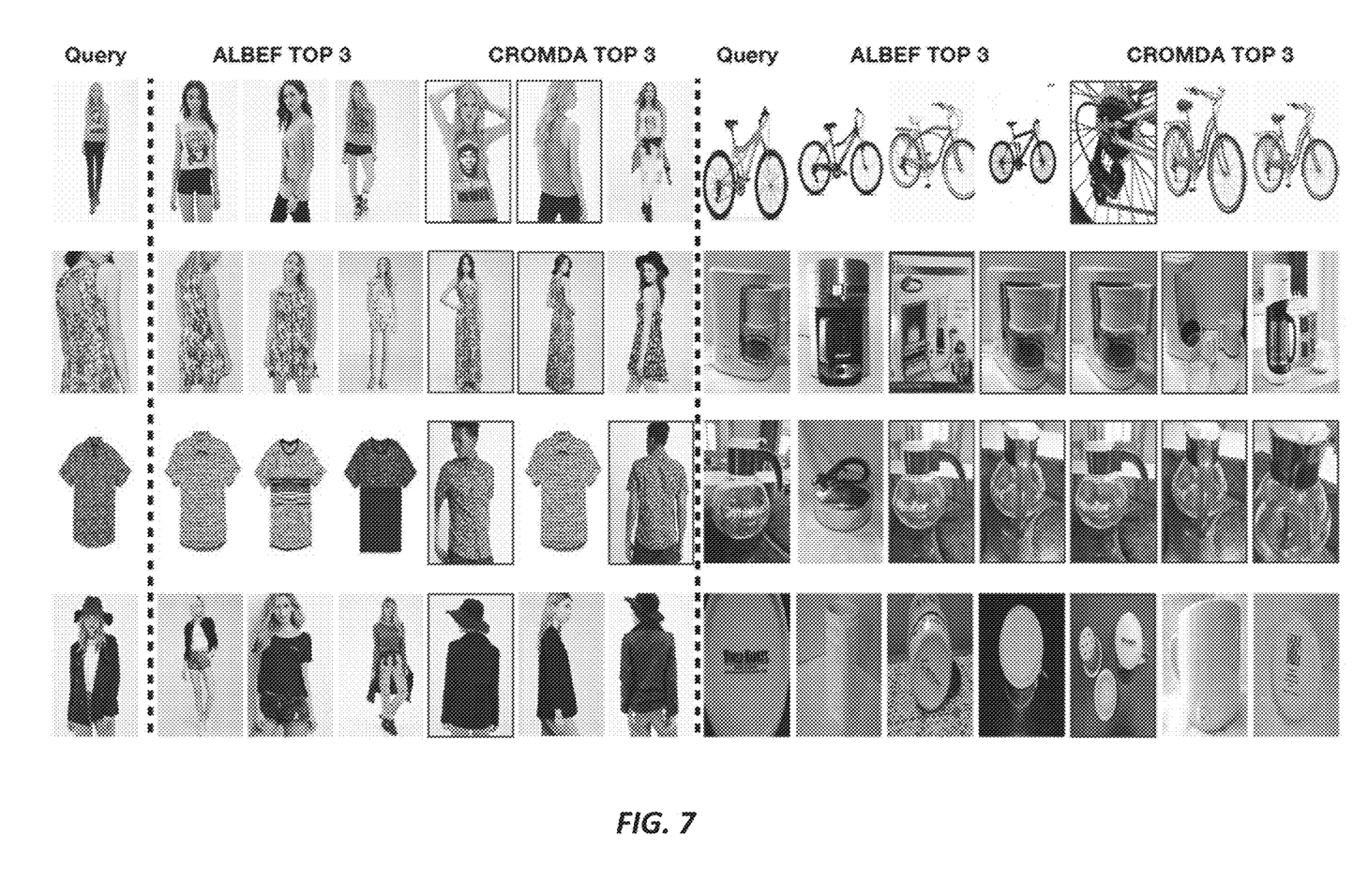

FIG. 7 demonstrate some image retrieval results on Deep Fashion In-store (left) and Stanford Online Products (right). From the top 3 highest similarities, ALBEF can find similar textures or styles, but sometimes fail to retrieval the same products. In contrast, CROMDA's top 2 highest similar products are exactly the same products to the query image. CROMDA's top-k similar images can be unmatched with the ground truth; however, similar to ALBEF, similar texture/style images are selected. Some interesting observations are that both ALBEF and CROMDA could capture the high-level fine-grained representations. Some challenging examples, e.g., first and last example on the right, are successfully retrieved by CROMDA. It proves that the image representation learning has been improved.

On the CxC Dataset, results are reported on CxC uni-modal (first two rows in Table 5 of FIG. 8). It is noted that except for R@5 on image-to-image retrieval, CROMDA obtains the best results, outperforming both ALIGN and ALBEF. It is observed that the most improvements exist at R@1.

Beyond uni-modal retrieval, experiments are performed on cross-modal retrieval. Good uni-modal representations benefit cross-modal representation learning. The performance of CROMDA is reported on Crisscrossed Captions (CxC) in Table 5 of FIG. 8. The last two columns show cross-modal retrieval performances. CROMDA achieves the best performances on all image-to-text metrics. On text-to-image metrics, CROMDA obtains the best results on R@5 and R@10. Although the result of R@1 is 0.6% be-hind ALIGN, CROMDA obtains best results on R@5 and R@10.

Results on Flickr30 and MSCOCO are reported in Table 6 of FIG. 9. Both image-to-text and text-to-image retrieval results are presented. Specifically, results are split in two parts. The first part is the zero-shot cross-modal result, and the second part is the fine-tuned result. It is shown that on both Flickr30K and MSCOCO, CROMDA achieves the best results in most evaluation metrics, especially R@1.

Specifically, in zero-shot results, CROMDA is compared with UNITER (Chen et al., Uniter: Universal image-text representation learning, in proceedings of ECCV, 2020), CLIP (Radford et al., Learning transferable visual models from natural language supervision. In arXiv preprint arXiv: 2103.00020, 2021), ALIGN (Jia et al., Scaling up visual and vision-language representation learning with noisy text supervision, in proceedings of International Conference on Machine Learning (ICML), 2021) and ALBEF. CROMDA outperforms ALBEF, by 1% and 1.4% on R@1 in Flickr30K, and outperforms ALBEF by 1.4% on R@1 text-to-image in MSCOCO. It is noted that CROMDA and ALBEF use 14M image-pairs in pre-training, while CLIP adopts 400M and ALIGN adopts 1B. The zero-shot performance directly reflects the effectiveness of the proposed method on cross-modal representation learning.

By fine-tuning for 10 epochs, results are compared with UNIMO (Li et al., Unimo: Towards unified-modal understanding and generation via cross-modal contrastive learning. in proceedings of ACL, 2021), OSCAR (Li et al., Oscar: object-semantics aligned pre-training for vision-language tasks, in proceedings of ECCV, 2020), and VILLA (Gan et al., Large-scale adversarial training for vision-and-language representation learning, in proceedings of NeurIPS, 2020) as well. In the bottom part of Table 6 of FIG. 9, it is seen that CROMDA improves ALBEF at R@1 of Flickr30K and MSCOCO by 1% and 1.1% individually. Moreover, in most evaluation metrics, CROMDA outperforms all baselines especially R@1.

Figure 10:
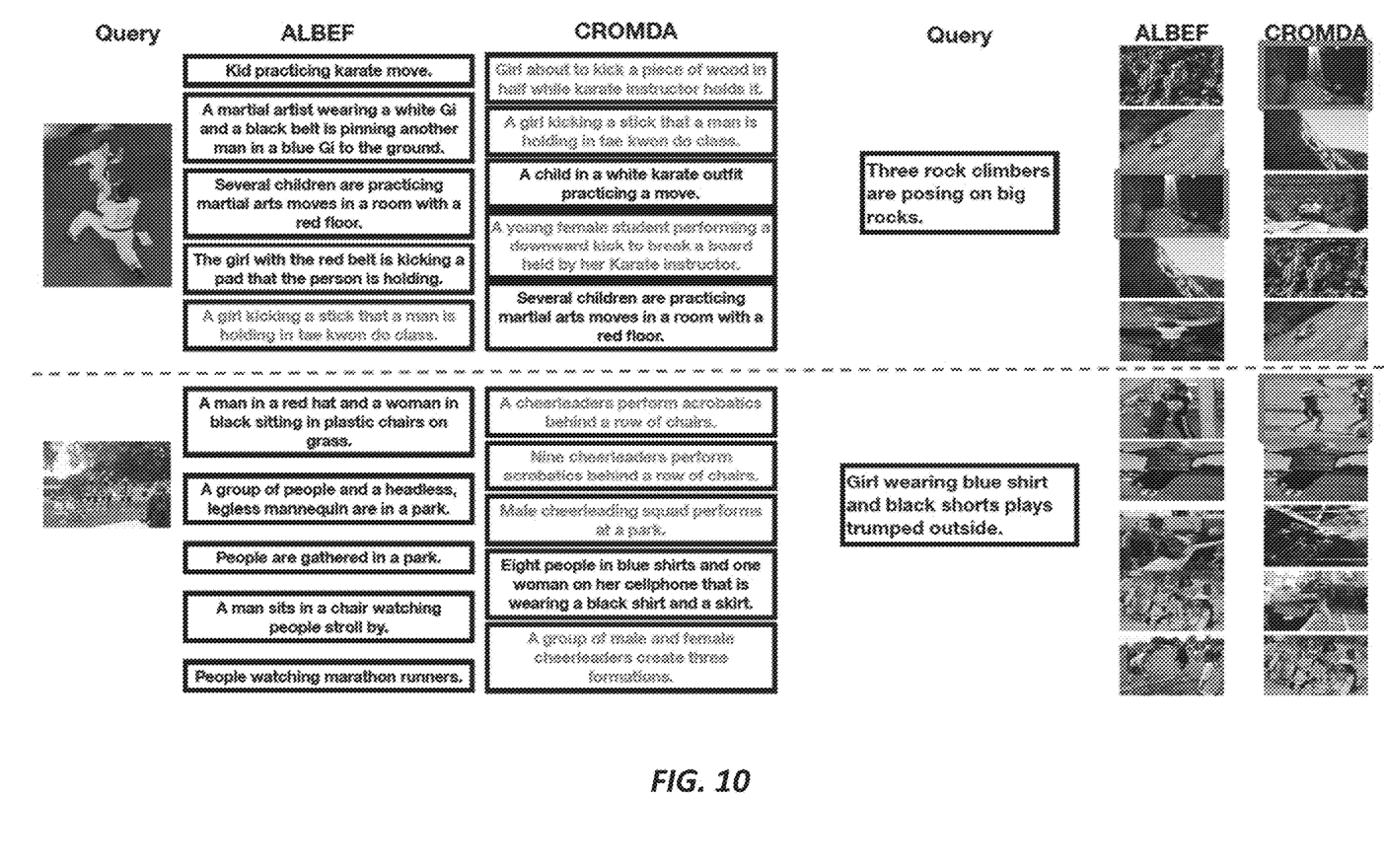

FIG. 10 demonstrates some cross-modal retrieval results on Flickr30K. From the top 5 highest similarities, ALBEF can find similar contents, e.g., "karate move" in the first image and "grass" in the second image. However, CROMDA's cross-modal top 5 similarities are closer to the ground truth. In image-to-text retrieval results, more than one top 5 retrieved texts are correct, which is not observed in ALBEF.

Figure 11:
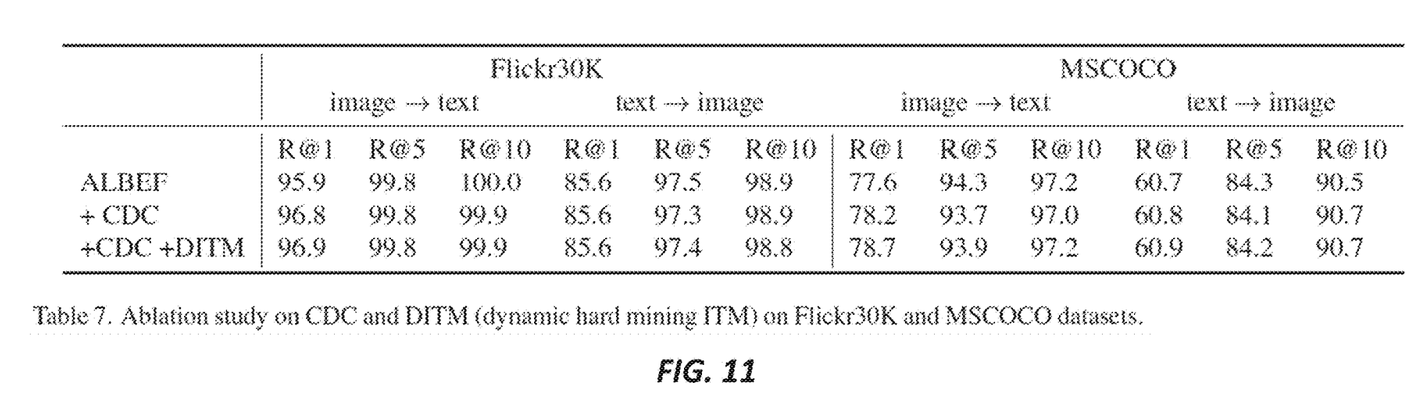

Table 7 of FIG. 11 studies the effect of CDC and dynamic hard negative sampling method. It is shown that most results improvements come from the CDC. On Flickr30K, dynamic hard negative mining on image-text matching (DITM) contributes little on the results, but its contribution on MSCOCO is larger. For example, image-to-text R@1 is improved from 78.2 to 78.7.

Figure 12:
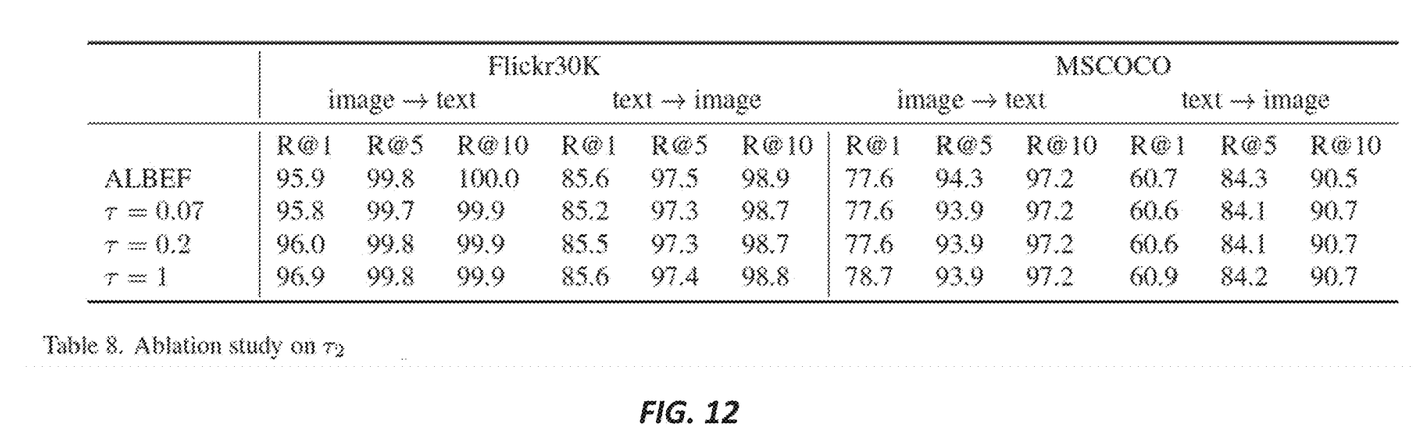

Table 8 of FIG. 12 show results of different $\tau_2$. A large $\tau_2$ improves results, which is the same to our expectation. The reason is that when $\tau_2$ is small, the distribution is normalized to close to a one-hot vector, which is not an ideal distribution anymore. CDC aims to align cross-modal distributions, and therefore a greater $\tau_2$ is preferred.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for vision-language distribution alignment, the system comprising:
   a data interface receiving a first batch of image samples and a second batch of text samples;
   a memory storing a plurality of processor-executable instructions, an image encoder for encoding the first batch of image samples into a first plurality of image feature representations stored at a first feature queue, and
   a text encoder for encoding the second batch of text samples into a second plurality of text feature representations stored at a second feature queue; and
   a processor executing the plurality of processor-executable instructions to perform operations comprising:
   computing an image-to-image similarity between at least one image feature representation and the first plurality of image feature representations in the first feature queue;
   computing a text-to-text similarity between at least one text feature representation and the second plurality of text feature representations in the second feature queue;
   computing a cross-modal alignment loss based on the image-to-image similarity and the text-to-text similarity; and
   updating the image encoder and the text encoder based at least in part on the cross- modal alignment loss.

2. The system of claim 1, wherein the image-to-image similarity is computed by:
   computing a plurality of momentum image feature representations as the plurality of image feature representations are continuously added to the first feature queue, wherein at least one momentum image feature representation is computed as an exponential moving average of image feature representations that are currently in the first feature queue; and
   computing the image-to-image similarity based on vector similarities between the at least one image feature representation and each of the plurality of momentum image feature representations.

3. The system of claim 1, wherein the text-to-text similarity is computed by:
   computing a plurality of momentum text feature representations as the plurality of text feature representations are continuously added to the second feature queue, wherein at least one momentum text feature representation is computed as an exponential moving average of text feature representations that are currently in the second feature queue; and
   computing the text-to-text similarity based on vector similarities between the at least one text feature representation and each of the plurality of momentum text feature representations.

4. The system of claim 1, wherein the cross-modal alignment loss is computed based on a first Kullback-Leibler divergence between the image-to-image similarity and the text-to-text similarity, and a second Kullback-Leibler divergence between the text-to-text similarity and the image-to-image similarity.

5. The system of claim 1, wherein the memory further stores a cross-modal encoder that applies cross-attention over the first plurality of image feature representations and second plurality of text feature representations.

6. The system of claim 5, wherein the operations further comprise:
selecting a subset of samples from the first batch of image samples and the second batch of text samples; and
compute an image-text matching loss based on a similarity between an image sample and a text sample in an image-text pair, and a one-hot ground truth corresponding to the image-text pair.

7. The system of claim 6, wherein the image-text pair is positive or negative, and
wherein the operations further comprise:
building an image-text queue storing a plurality of image-text pairs from the first batch of image samples and the second batch of text samples,
wherein the image-text queue is dynamically updated when new input samples are received;
selecting a negative sample corresponding to a sample in the subset from the image-text queue to form a negative image-text pair.

8. The system of claim 1, wherein the operations further comprise:
randomly replacing text tokens in the second plurality of text samples with a mask token at a probability;
predicting replaced text tokens based on the cross-attention; and
computing a masked language modeling loss based on the predicted text tokens and original text tokens.

9. The system of claim 1, wherein the operations further comprise:
computing an image-to-text similarity between the at least one image feature representation to all text feature representations in the second feature queue;
computing a text-to-image similarity between the at least one text feature representation to all image feature representations in the first feature queue; and
computing a cross-modal contrastive loss based on a first cross-entropy between the image-to-text similarity and an image-to-text ground truth, and a second cross-entropy between the text-to-image similarity and a text-to-image ground truth.

10. The system of claim 1, wherein the operations further comprise:
computing a weighted sum of the cross-modal distribution alignment loss, a cross-modal contrastive loss, a masked language modeling loss and an image-text matching loss; and
updating at least the image encoder and the text encoder based on the weighted sum.

11. A method for vision-language distribution alignment, the method comprising:
receiving, via a data interface, a first batch of image samples and a second batch of text samples;
encoding, by an image encoder, the first batch of image samples into a first plurality of image feature representations stored at a first feature queue;
encoding, by a text encoder, the second batch of text samples into a second plurality of text feature representations stored at a second feature queue;
computing an image-to-image similarity between at least one image feature representation and the first plurality of image feature representations in the first feature queue;
computing a text-to-text similarity between at least one text feature representation all and the second plurality of text feature representations in the second feature queue;
computing a cross-modal alignment loss based on the image-to-image similarity and the text-to-text similarity; and
updating the image encoder and the text encoder based at least in part on the cross-modal alignment loss.

12. The method of claim 11, wherein the image-to-image similarity is computed by:
computing a plurality of momentum image feature representations as the plurality of image feature representations are continuously added to the first feature queue, wherein at least one momentum image feature representation is computed as an exponential moving average of image feature representations that are currently in the first feature queue; and
computing the image-to-image similarity based on vector similarities between the at least one image feature representation and each of the plurality of momentum image feature representations.

13. The method of claim 11, wherein the text-to-text similarity is computed by:
computing a plurality of momentum text feature representations as the plurality of text feature representations are continuously added to the second feature queue, wherein at least one momentum text feature representation is computed as an exponential moving average of text feature representations that are currently in the second feature queue; and
computing the text-to-text similarity based on vector similarities between the at least one text feature representation and each of the plurality of momentum text feature representations.

14. The method of claim 11, wherein the cross-modal alignment loss is computed based on a first Kullback-Leibler divergence between the image-to-image similarity and the text- to-text similarity, and a second Kullback-Leibler divergence between the text-to-text similarity and the image-to-image similarity.

15. The method of claim 11, further comprising:
applying, by a cross-modal encoder, cross-attention over the first plurality of image feature representations and second plurality of text feature representations.

16. The method of claim 11, further comprising:
selecting a subset of samples from the first batch of image samples and the second batch of text samples; and
compute an image-text matching loss based on a similarity between an image sample and a text sample in an image-text pair, and a one-hot ground truth corresponding to the image- text pair.

17. The method of claim 16, wherein the image-text pair is positive or negative, and
wherein the method further comprises:
building an image-text queue storing a plurality of image-text pairs from the first batch of image samples and the second batch of text samples, wherein the image-text queue is dynamically updated when new input samples are received;
selecting a negative sample corresponding to a sample in the subset from the image- text queue to form a negative image-text pair.

18. The method of claim 11, further comprising:
randomly replacing text tokens in the second plurality of text samples with a mask token at a probability;

predicting replaced text tokens based on the cross-attention; and computing a masked language modeling loss based on the predicted text tokens and original text tokens.

19. The method of claim 11, further comprising:

computing an image-to-text similarity between the at least one image feature representation to all text feature representations in the second feature queue;

computing a text-to-image similarity between the at least one text feature representation to all image feature representations in the first feature queue;

computing a cross-modal contrastive loss based on a first cross-entropy between the image-to-text similarity and an image-to-text ground truth, and a second cross-entropy between the text-to-image similarity and a text-to-image ground truth;

computing a weighted sum of the cross-modal distribution alignment loss, the cross-modal contrastive loss, a masked language modeling loss and an image-text matching loss; and jointly updating at least the image encoder and the text encoder based on the weighted sum.

20. A non-transitory processor-readable storage medium storing a plurality of processor-executable instructions for vision-language distribution alignment, the instructions being executed by a processor to perform operations comprising:

receiving, via a data interface, a first batch of image samples and a second batch of text samples;

encoding, by an image encoder, the first batch of image samples into a first plurality of image feature representations stored at a first feature queue;

encoding, by a text encoder, the second batch of text samples into a second plurality of text feature representations stored at a second feature queue;

computing an image-to-image similarity between at least one image feature representation and the first plurality of image feature representations in the first feature queue;

computing a text-to-text similarity between at least one text feature representation and the second plurality of text feature representations in the second feature queue;

computing a cross-modal alignment loss based on the image-to-image similarity and the text-to-text similarity; and updating the image encoder and the text encoder based at least in part on the cross-modal alignment loss.

* * * * *